United States Patent [19]
Holliday, Jr. et al.

[11] Patent Number: 5,537,460
[45] Date of Patent: Jul. 16, 1996

[54] METHOD AND APPARATUS FOR DETERMINING THE PRECISE LOCATION OF A MODIFIED CELLULAR TELEPHONE USING REGISTRATION MESSAGES AND REVERSE CONTROL CHANNEL TRANSMISSION

[76] Inventors: Robert O. Holliday, Jr., 3901 El Cimo La, NE., Bainbridge Island, Wash. 98110; Jerry W. Howe, 24130 Johnson Rd., NW., Poulsbo, Wash. 98370

[21] Appl. No.: 272,321

[22] Filed: Jul. 8, 1994

[51] Int. Cl.[6] .................................................. H04Q 7/32
[52] U.S. Cl. .................. 379/59; 379/34; 379/37; 455/54.1; 340/539; 340/825.54
[58] Field of Search .................... 379/33, 34, 37–39, 379/42–44, 59; 455/33.1, 54.1, 67, 95, 100, 101, 115; 342/450, 457; 340/531, 539, 572, 573, 825.49, 825.54

[56] References Cited

U.S. PATENT DOCUMENTS

| | | | |
|---|---|---|---|
| Re. 34,496 | 1/1994 | Franklin et al. | 379/59 |
| 4,021,807 | 5/1977 | Culpepper et al. | |
| 4,475,106 | 10/1984 | Andrews . | |
| 4,486,757 | 12/1984 | Ghose et al. | |
| 4,562,572 | 12/1985 | Goldman et al. | 455/33.1 |
| 4,596,988 | 6/1986 | Wanka | 455/92 |
| 4,597,105 | 6/1986 | Freeburg | 455/33.4 |
| 4,742,357 | 5/1988 | Rackley | 342/457 |
| 4,746,830 | 5/1988 | Holland | 310/313 D |
| 4,777,656 | 10/1988 | Wade | 455/98 |
| 4,791,572 | 12/1988 | Green, III et al. | 342/457 |
| 4,799,062 | 1/1989 | Sanderford, Jr. et al. | 342/457 |
| 4,891,650 | 1/1990 | Sheffer | 342/457 |
| 4,908,629 | 3/1990 | Apsell et al. | 342/457 |
| 5,003,316 | 3/1991 | Ostermiller | 342/429 |
| 5,016,269 | 5/1991 | Rogers | 379/59 |
| 5,121,126 | 6/1992 | Clagett | 379/59 |
| 5,146,231 | 9/1992 | Ghaem et al. | 342/357 |
| 5,212,807 | 5/1993 | Chan | 455/33.4 |
| 5,218,367 | 6/1993 | Sheffer et al. | 342/457 |
| 5,218,716 | 6/1993 | Comroe et al. | 379/59 |
| 5,230,081 | 7/1993 | Yamada et al. | 379/59 |
| 5,266,958 | 11/1993 | Durboraw, III | 342/357 |
| 5,289,527 | 2/1994 | Tiedemann, Jr. | 379/59 |
| 5,293,642 | 3/1994 | Lo | 455/33.1 |
| 5,327,144 | 7/1994 | Stilp et al. | 342/457 |
| 5,388,147 | 2/1995 | Grimes | 379/59 |

*Primary Examiner*—Dwayne D. Bost
*Attorney, Agent, or Firm*—Nixon & Vanderhye

[57] ABSTRACT

A remote command and control center follows and finds a small object located within the geographic area of coverage of one or more cellular radiotelephone systems. A tagging device, radiotelephone, with a unique identification placed on or in any object will automatically activate when required and emit radio frequency signals, allowing it to be traced and located throughout the nation's cellular radiotelephone system. The radiotelephone accepts and implements commands from the remote command and control center and will ultimately be acquired with the use of a mobile direction finding radio/receiver and antenna set.

19 Claims, 4 Drawing Sheets

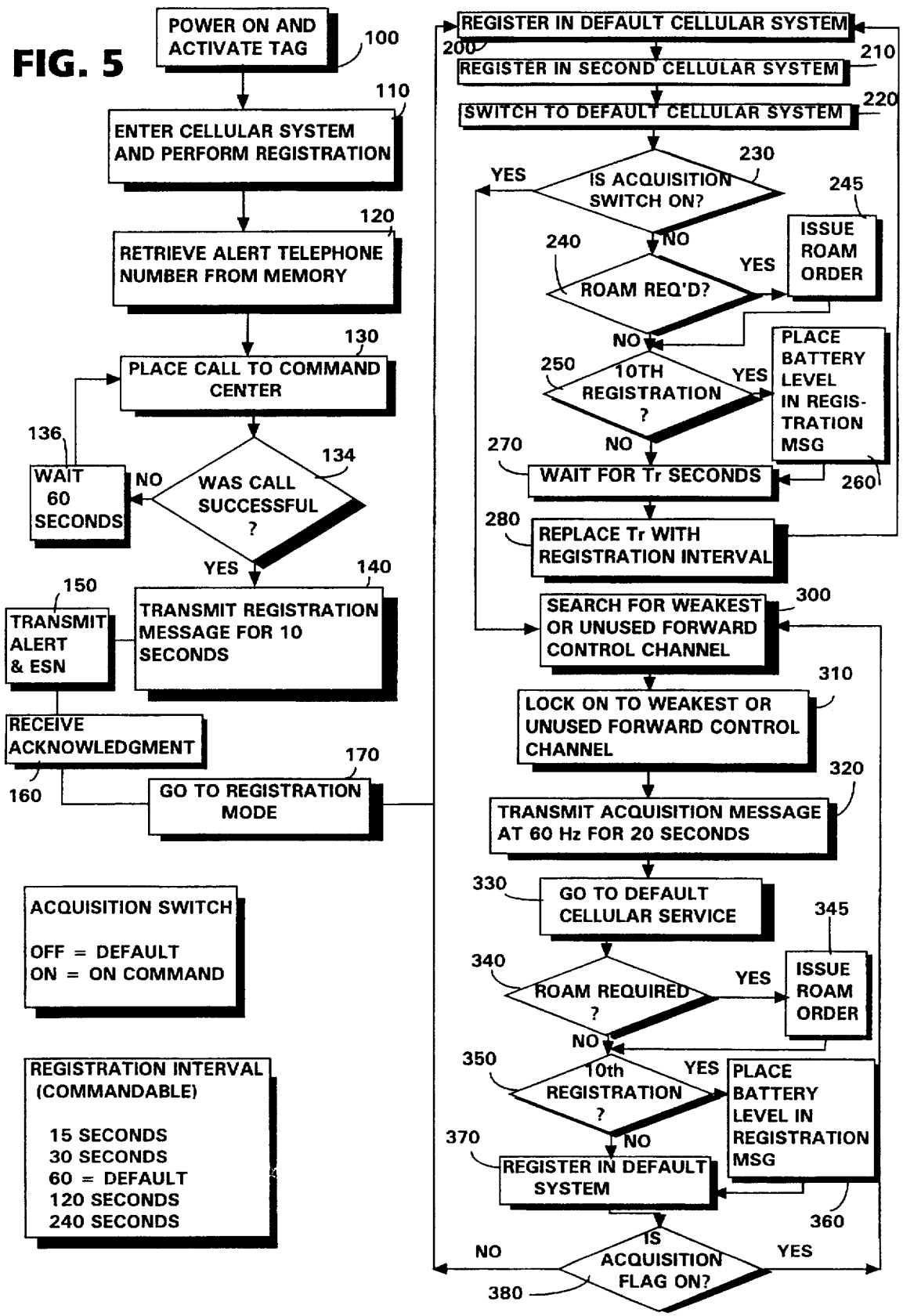

METHOD AND APPARATUS FOR DETERMINING THE PRECISE LOCATION OF A MODIFIED CELLULAR TELEPHONE USING REGISTRATION MESSAGES AND REVERSE CONTROL CHANNEL TRANSMISSION

TECHNICAL FIELD

The invention relates generally to communication systems, and in particular to a method of managing a unique cellular radiotelephone within a cellular telephone system from a remote command and control center for the purposes of locating and recovering this uniquely identified cellular radiotelephone.

BACKGROUND AND DISCUSSION OF PRIOR ART

Contemporary law enforcement and private security organizations must be able to surreptitiously follow vehicles, aircraft, objects, and people. In the past, small relatively low powered radio transmitters were secreted on the object to be followed. Radio direction finding equipment was then deployed to locate and acquire the object. The transmitting device is generally referred to as a beacon or tag, the process of placing the device on the object is referred to as tagging, and locating and following the tag is referred to as tracking.

Today's typical tag is a relatively low powered very high frequency radio transmitter that is manually activated when placed on the object to be tracked. It continually transmits a code of some sort until either the battery energy is depleted or the tracking operation is completed (U.S. Pat. No. 4,021,807 to Culpepper et al). Some tags can change their transmitted code based on local activity (motion, temperature change, etc.). These tags must have external sensors and specially designed electronic logic to accomplish their tasks. Other more advanced tags are commandable (U.S. Pat. No. 4,596,988 to Wanka). A radio signal from a remote unit can cause the transmissions to be turned on or off, or the transmission pattern can be modified as the situation dictates. This kind of tag needs a radio receiver to acquire the command signals, logic of some type to interpret and translate the signals into instructions, and a transmitter that is capable of carrying out the instructions.

Conventional tags have inherent weaknesses. Since a low power tag transmits over a relatively short distance, the only way to track it is to constantly monitor its transmissions with an appropriate radio receiver. Either full time field staff follow and monitor the tag during the tracking period, or a central office monitors the tag by using a system of dedicated receiving antennas that have been installed throughout the tracking area. Both choices are costly and impractical for a realistic national system. Further, the mission fails if the tag moves outside of the effective range of the tracking radio or of the antenna field.

There have been several creative enhancements to the conventional tag. Transmission characteristics have been modified to lower the probability of electronic detection (spread spectrum, microburst, etc.). Transmitters have been miniaturized for such applications as avian research (Telonics, Inc.). Several manufacturers have integrated position location systems, such as LORAN (U.S. Pat. No. 4,742,357 to Rackley) and GPS, with tags to allow tracking from a centralized location. QUALCOMM, GEOSTAR, and others have integrated position location systems with satellite transmitters. Cellular radiotelephones have been proposed as transmitting and receiving conduits for large, complex vehicle location systems (U.S. Pat. No. 5,218,367). Each of these techniques works in its intended application area. However, none adequately addresses the situation of tracking small, light, valuable objects in an urban environment.

Tags that use dedicated on board position location systems suffer from other problems. Their size, weight, and power consumption levels render them unacceptable for many tagging applications. The combined size and combined weight of the position location device, and the transmitter and receiver (for a commandable tag), could easily be greater than the object to be tracked. This is unfeasible.

Ideally a tag designed specifically for small objects would be installed long before the tracking need arose. It would lie dormant, in a power off state and thus retain sufficient battery energy to carry out its mission when activated. The tag would be commandable, would be tracked remotely, and would require intervention by field personnel only during final acquisition and apprehension. It would also have wide, and preferably, national coverage. There is no currently available tag with these characteristics. The disclosed tagging/tracking system meets these criteria. It solves the problems of size, weight, and energy consumption, and provides urban position location adequate for most law enforcement purposes.

SUMMARY OF THE INVENTION

The invention uses available cellular telephone infrastructure and is designed to adapt to any future advances in cellular technology. Contemporary mobile cellular radiotelephones are small and light. Complete mobile cellular radiotelephones with batteries weigh in the seven ounce range and measure less than two inches by six inches by one-half of an inch. For most small object tagging applications this is an acceptable size/weight combination. A mobile cellular radiotelephone modified to accept a set of tracking commands in addition to its cellular radio commands can easily function as an effective tag. Since a cellular telephone switch, referred to as a mobile telephone switching office (MTSO), knows the approximate location of all cellular mobile radiotelephones in its system, a tag that is a fully compliant cellular radiotelephone meets most of the requirements of remote tracking. The coverage of cellular telephone systems is virtually national, and all cellular telephones must comply with a national standard. Accordingly, the cellular tag's area of application is considerable.

BRIEF DESCRIPTION OF THE DRAWINGS

FIG. 5 is a diagram of the tagging logic.

DETAILED DESCRIPTION OF THE INVENTION

The system has four components, a modified commercially available mobile cellular radiotelephone, at least one cellular system, a command and control center, and a direction finding receiver set. The system operates in three modes, an alert mode, a registration/tracking mode, and an acquisition mode.

Figure 1:
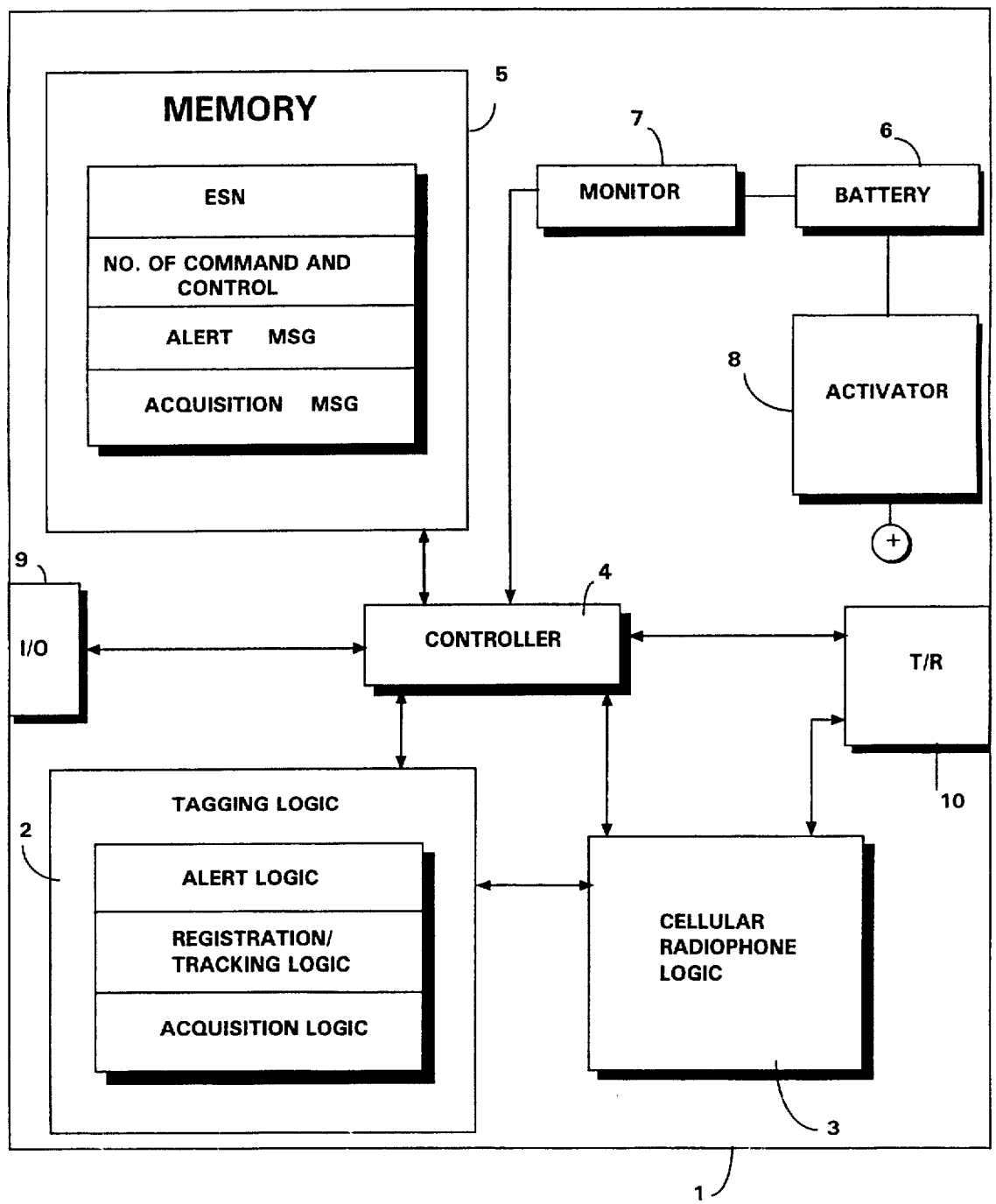
FIG. 1 is a block diagram of a modified cellular radiotelephone.

A modified mobile cellular radiotelephone or tag 1 is illustrated in block form in FIG. 1. The principal units of this component comprise tagging logic 2, cellular radiotelephone logic 3, controller 4, memory 5, battery 6, battery monitor 7, activator 8, I/O ports 9 and transceiver 10. The memory 5 has stored therein the phone number of the command and control center, the electronic serial number (ESN) of the cellular radiotelephone, an alert message, an acquisition message, and a prearranged telephone number. The I/O ports are for connection to an external device that is either subject to being sent control signals from the command and control center or a sensor that is able to provide information for the command and control center.

The tagging logic can be placed on an added integrated circuit chip or can be inserted into the cellular radiotelephone's cellular logic, should room be available. The tag is placed on the object to be tracked some time (e.g., months) before the anticipated tracking operation. It remains in a power off state until activated. If battery 6 is a secondary (rechargeable) battery, it will be subjected to a constant trickle charge to maintain its viability. A primary (non-rechargeable) battery that will remain in a power off state until activation and be replaced periodically can be used.

Activator 8 includes at least one switch that is actuated to apply battery power from battery 6 to the components of the radiotelephone. One technique for activating the switch is to have the radiotelephone normally placed in a holding unit such that the switch is held in a deactivated position until the radiotelephone is removed from the holding unit. Another technique involves the radiotelephone being held in a direct or inductively coupled trickle charging holster whereupon a breaking of the trickle charge coupling causes activation of the switch. Other techniques or means for activating the unit or for actuating a switch, or one of a plurality of parallel connected switches, will be apparent to those skilled in this art.

Figure 2:
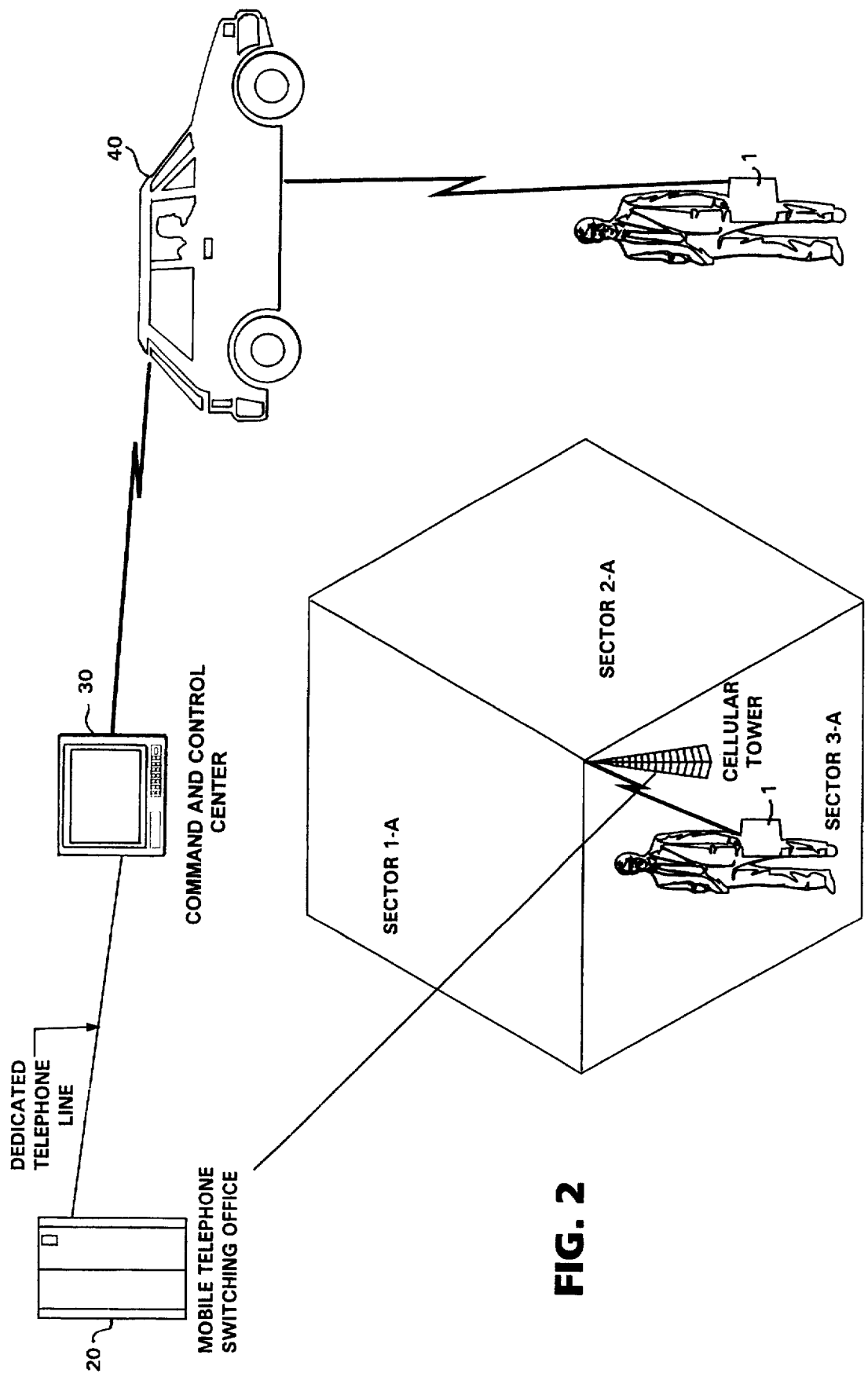
FIG. 2 is a pictorial representation of the complete system.

FIG. 2 shows the overall system. An object, here a brief case, contains the modified cellular radiotelephone 1 of FIG. 1 which has been activated. The cell of a cellular system wherein the object resides relays the communique along with cell location data from the cellular telephone to the MTSO 20 which forwards it over available communication links to the command and control center 30. During the acquisition mode the command and control center guides the pursuers 40 of the object to the cell where the object is located. Direction finding equipment is employed by the pursuers for precisely locating the object in the cell.

Upon activation, registration will occur and the tagging logic will direct that a telephone call be placed to the command and control center component of the system. The command and control center includes digital computers that receive the call and log the binary coded message sent by the tag. The message consists of a preassigned alert code and, most critically, the tag's unique identification—its electronic serial number (ESN). This initial telephone call serves as a fail safe mechanism, which will become evident later. The tagging logic will seek a message from the command and control center acknowledging the receipt of the alert message. The tag's unique identification code keys the command and control center's operational data base, which provides system operators with all available information about the tagged object's description and location, and any special instructions.

Once the initial call has been acknowledged the modified cellular radiotelephone's tagging logic will shift into a registration/tracking mode. MTSOs need to know the location of each mobile radiotelephone served by the cellular system. This is accomplished by polling the cellular system and having each cellular radiotelephone periodically inform the system of its location. The process is referred to as registration.

When a radiotelephone registers, it informs the MTSO of the cell in which it is located. This is done by sending a standard message to the MTSO on the Reverse Control Channel of the cell in which the radiotelephone is located. The tag registers differently from a normal radiotelephone. In areas where there are two cellular telephone service providers, called "A" and "B" providers, the tag will register in both the A and B systems, one immediately after the other. Each MTSO passes the registration information to the command and control center in real or near real time. The dual registration serves to reduce the size of the area in which the cellular telephone is determined to be located.

Thus, upon activation of the tag, the command and control center knows all of the details of the tag and of the tagged object, and knows the tag's precise initial location. It subsequently receives periodic updates of the tag's approximate location. Should cellular telephone companies decide to provide more accurate position location information in the future, the system will avail itself of this service.

The area covered by a cell in an urban environment is limited. This is because each cell can only manage a finite number of cellular radiotelephones. To service larger numbers of customers cellular telephone companies divide cells into subcells or sectors. Typical sectors are one-third of a roughly circular shaped cell. Each such sector consists of a circular segment of 120 degrees of arc. Cells of one-sixth of a circle (60 degrees of arc) have been proposed; antenna technology defines the practical limits of sectorizing.

Figure 3:
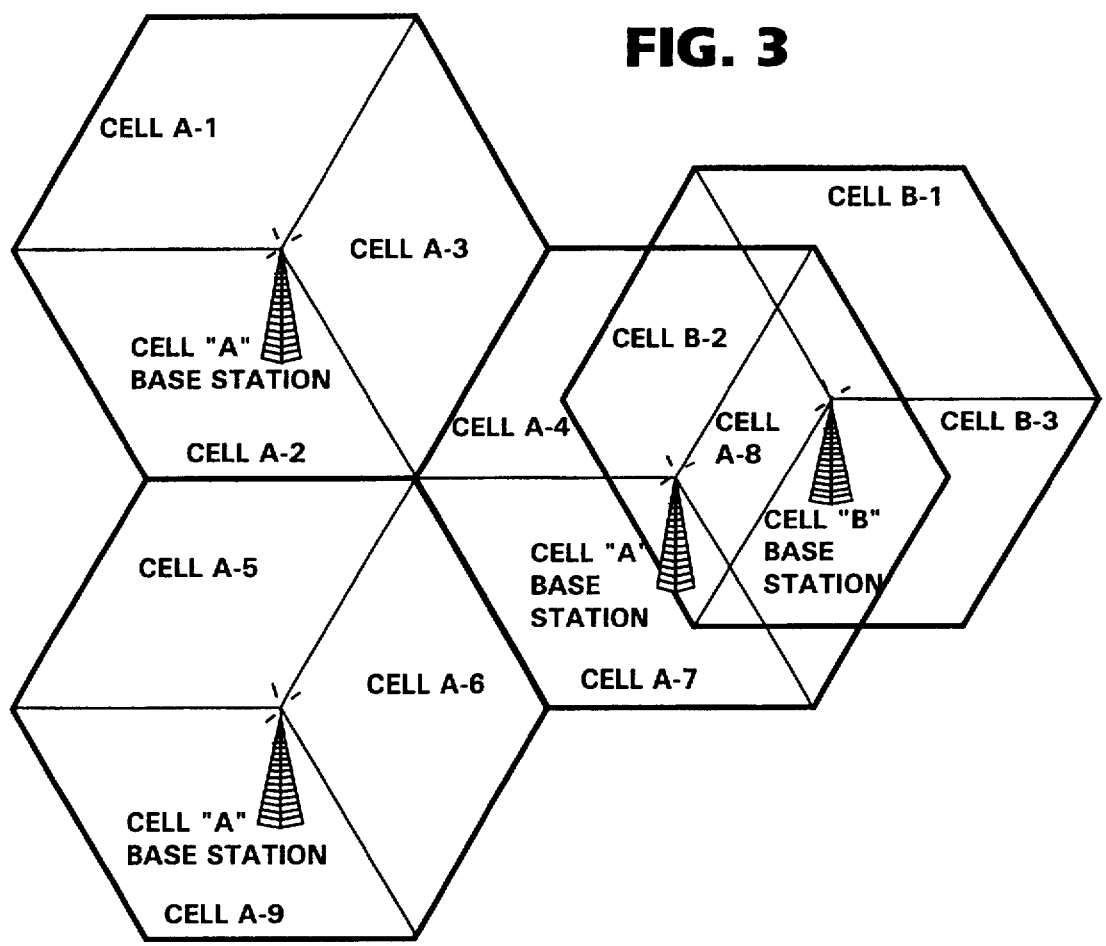
FIG. 3 illustrates two cellular systems "A" and "B"
Figure 4:
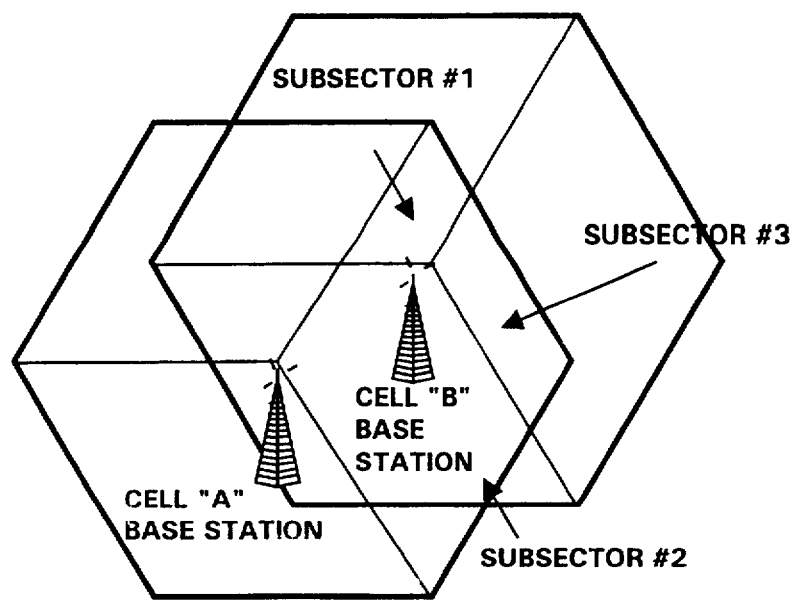
FIG. 4 illustrates two subsectors provided by the overlap of two cellular systems.

In FIG. 3, elements identified as A-1, A-2 and A-3 illustrate the principle of sectoring. Also shown in this figure is the overlap of cell sectors A-4,A-7,A-8 of a system "A" cell with cell sectors B-1 ,B-2,B-3 of a system "B" cell. As can be observed, cell sector A-8 overlaps cell sector B-2 in a limited subsector area. Registration of a cellular radiotelephone in both cell sector A-8 and cell sector B-2 locates the radiotelephone in a small subsector area. FIG. 4 identifies three subsector areas, #1, #2 and #3, which have a common cell A sector and different cell B sectors. Other cell A sector and cell B sector combinations are readily apparent.

When registration occurs at approximately the same time in two or more cellular systems, "A" and "B", that service the area, the accuracy of the approximate location increases dramatically. Since both cellular providers rarely use the same antenna location, two sectorized antennas covering the same area result in a geometry represented by two intersecting triangles. Each of the geometric areas resulting from the intersecting triangles can be uniquely identified and used as position location subareas, or subsectors. A further advantage of dual registration is that the tag's approximate position will be set by two independent methods. This will serve to remove the confusion caused by the possibility of a tag being forced to register in a cell that is not its most proximate cell.

The command and control center computers are equipped with commercially available digital street maps for the area of operations. These street maps have overlays consisting of up to date cell, sector, and subsector boundaries. Thus, when the command center receives registration messages from the "A" and "B" service MTSOs, which include the tag cell/ sector locations, the computers determine the tag's subsector location and show that location on the displays.

Cellular radiotelephones are polled periodically (every fifteen minutes, typically) and directed to register their location. Registration occurs automatically when a cellular radiotelephone is handed off to a new cell, typically when a sector boundary is crossed. The tagging logic will force registration more frequently. The registration repetition rate will be set to a default value initially, and is modified from the command center via a telephone call to the tagging logic. This more frequent registration will enable the command center to confirm the tag's track through whatever cellular telephone cells, sectors, or subsectors it transits.

The registration process provides the command and control center with tracking data. However, since it is a one way transaction, registration alone cannot guarantee that the command center has been made aware that a tracking situation has occurred. A fail safe method that ensures acknowledgment of the situation is necessary. This is accomplished by the initial telephone call from the tag to the command center.

Several actions occur when the command and control center decides that the tracking mission must be brought to closure. Personnel who actually carry out the acquisition are directed to the cell, sector, or subsector where the tag is located. Acquisition personnel are equipped with a radio receiver/direction finder keyed specifically to the tag. The tag's cellular radiotelephone logic proceeds with the registration process as modified by the tagging logic. When the tagging mission is to be brought to a close, the command control and center calls the tag and directs the tagging logic to enter the acquisition mode. In this mode the tagging logic causes the tag to exit the registration mode and to enter a timed cycle called the tag acquisition mode.

The tag initiates the tag acquisition mode by scanning available forward control channels and identifying the weakest, or an unused forward control channel. Due to the pattern of urban cells this forward control channel will actually be unused in the tag's cell and in adjacent cells. The tag locks onto the weakest, or an unused, forward control channel and transmits a prearranged signal on the associated reverse control channel for a specified period. The prearranged signal will include the tag's electronic serial number in binary form. After the specified transmission period the tag reverts to the cellular mode, where the commandable registration process continues for the remainder of the cycle. This completes one tag acquisition cycle. The duration of the cycle is set to a default value. Because the tag transmits acquisition signals on the weakest, or an unused, reverse control channel, for reception by a direction finding receiver set there will be no impact on the cellular telephone system.

The direction finding receiver set used by acquisition personnel contains logic that will allow it to only respond to specific transmissions. These transmissions must come from a reverse control channel, must have a specific message format, and must include the tag's electronic serial number. The command center programs the direction finding receiver before the acquisition mode. The receiver's direction finding logic will only lock onto a particular electronic serial number. Thus, the transmission from the tag is unique as far as the direction finder is concerned; it will only respond to a particular tag.

To acquire the tag, acquisition personnel are directed to a cell, sector, or subsector where the tag is known to be located. The command center then directs the tag to periodically transmit a unique signal that allows the acquisition to occur.

The tagging logic 2, which includes alert logic (100–170), registration and tracking logic (200–280) and acquisition logic (300–380), is shown in FIG. 5. In the alert mode, the cellular radiotelephone upon activation applies battery power to the radiotelephone (100), the radiotelephone enters the cellular system and registers with a cell (110), retrieves from memory the phone number of the command and control center (120) and initiates a call to the command and control center (130), repeats the call to the command center until successfully connected (134, 136), transmits a registration message (140), transmits the alert message and ESN to the command center (150), receives an acknowledgment (160) and proceeds to the registration and tracking mode (170).

In the registration and tracking mode the radiotelephone registers in a second cellular system (210) and alternates between the two systems at a default interval of about 60 seconds (220–280). The time interval is changeable upon command from the command center (280). When transferring from one geographic area to another, roaming and registration procedures (240–250) are instituted in the system in the next geographic area. In addition, a message indicating the level of the battery can be included in the registration message (260). The registration and tracking mode continues until directed by the command center to switch to the acquisition mode (230).

In the acquisition mode, the radiotelephone searches for the weakest or unused forward control channel of the cell (300), locks onto it (310) and uses the associated reverse control channel to transmit a short message containing its ESN (320). Switching back to the default cellular system (330) is then effected to permit registration and location of the radiotelephone, battery status message, and roaming if necessary (340–370). An acquisition flag (380) is set in correspondence with the acquisition switch and the logic either recycles through the acquisition mode or returns to the tracking and registration mode.

The tag also has a set of commandable output ports and smart input ports 9. These ports are managed by the tagging logic. Thus, a device attached to the tag can be turned on or off by the command center by calling the tag and managing the tag's output ports. Conversely, an event measured by an external device can cause a signal to be issued to one of the tag's input ports.

The function of the input/output ports is to manage an external device, pass a message to an external device, inform the command and control center of the occurrence of an external event, or to pass an externally originated message to the command center. Voice transmissions will be allowed.

An externally sensed event is registered with an input port by causing the position of a binary switch to be changed. The tagging logic senses the change in the switch, and informs the command and control center of the event's occurrence by modifying the registration message for a specific number of registration transmissions. Modifying the registration messages removes the need to place a telephone call to the command and control center, which conserves battery energy. If battery energy is not a concern, the tagging logic can inform the command and control center of the occurrence by calling a prearranged telephone number and relaying a prearranged message.

A message can be passed from an external source through an input port and stored in the tag's memory. The tagging logic senses the message's presence, calls a prearranged telephone number, and relays the message. Voice transmissions will pass directly through the tag to the command and control center.

Conversely, the command and control center can call the tag and direct the tagging logic to turn an external device on or off. Further, the command and control center can send a message to the tag, and have it stored in the tag memory. The tagging logic can then send the message to an external device.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for tracking an object comprising, a first cellular radiotelephone system comprising cellular radiotelephones, cellular transmitting/receiving cells and a mobile telephone switching office, a command and control center coupled to said first cellular radiotelephone system, a modified cellular radiotelephone actable to automatically switch to a power on state, initiate a call to said command and control center, transmit a message including its identification; and maintain a communication channel with said command and control center, said modified cellular radiotelephone and first cellular system automatically performing a cell registration process which identifies to the first cellular system and said command and control center the cell in which said modified radiotelephone is located, said command and control center including a computer for computing and displaying the location of said modified cellular radiotelephone, a second cellular radiotelephone system comprising cellular radiotelephones, cellular transmitting/receiving cells and a mobile telephone switching office, said modified cellular radiotelephone performing a cell registration process with said second cellular radiotelephone system which registration information is forwarded to said command and control center and said command and control center using the registration information received from said first cellular radiotelephone system and said second cellular radiotelephone system to determine the location of said cellular radiotelephone.

2. A system for tracking an object as in claim 1 including one or more additional cellular radiotelephone systems in which said modified radiotelephone registers and provides cell registration information to said command and control center for determining the location of said modified cellular radiotelephone.

3. A system for tracking an object as in claim 1 wherein said command and control center is coupled to said cellular radiotelephone systems via a public telephone switching network.

4. A system for tracking an object as in claim 3 wherein said modified cellular radiotelephone alternately registers with said cellular radiotelephone systems.

5. A system for tracking an object as in claim 2 further comprising an external device connected to said modified cellular radiotelephone, said external device being responsive to commands from said command and control center to turn on, turn off, accept a digital message, or send a digital message.

6. A system for tracking an object as in claim 1, further comprising a mobile component for precision tracking and locating said modified cellular radiotelephone which includes direction finding equipment.

7. A system for tracking an object as in claim 6 wherein said modified cellular radiotelephone is responsive to commands from said command and control center to lock onto the weakest forward control channel of the cell in which it is located and transmit a message, including its identity, on the reverse control channel associated with said weakest forward control channel, and said mobile component, upon being directed by the command and control center to the vicinity of said modified cellular radiotelephone and being given the identity being transmitted, acquiring with said direction finding equipment said cellular radiotelephone transmission, and locating and tracking said modified cellular radiotelephone.

8. A system for tracking an object comprising, a cellular radiotelephone system comprising cellular radiotelephones, cellular transmitting/receiving cells and a mobile telephone switching office, a command and control center coupled to said cellular radiotelephone system, a modified cellular radiotelephone actuable to automatically switch to a power on state, initiate a call to said command and control center, transmit a message including its identification, and maintain a communication channel with said command and control center, said modified cellular radiotelephone and cellular system automatically performing a cell registration process which identifies to the cellular system and said command and control center the cell in which said modified radiotelephone is located, said command and control center including a computer for computing and displaying the location of said modified cellular radiotelephone, an actuation device for turning on power to said modified cellular radiotelephone, a battery supplying power to said modified cellular radiotelephone, a circuit for monitoring the condition of said battery and providing a message on battery condition for sending to said command and control center, tagging logic including alert mode logic, registration and tracking mode logic, and acquisition mode logic, a memory for storing the command and control center phone number, an alert message, and the electronic identification number of the unit, and a controller coupled to said tagging logic and said memory.

9. A modified cellular radiotelephone unit comprising a battery power supply, a circuit for monitoring the status of the battery and an activation switch for activating the radiotelephone unit, radiotelephone logic and tagging logic coupled to a controller, I/O ports for connecting external devices to said controller, a memory and a transmit/receive unit coupled to said controller, and wherein said memory contains stored therein the telephone number of a command and control center, the electronic serial number of the unit, an alert message and an acquisition message.

10. A modified cellular radiotelephone unit as in claim 9 wherein said tagging logic comprises alert logic for calling said command and control center, registration and tracking logic for providing said command and control center with information pertaining to the location of the unit in a cell of one or more cellular radiotelephone systems, and acquisition logic for scanning a cell of one of said cellular telephone systems to find and lock onto the weakest or an unused forward control channel and transmitting on its associated reverse control channel said acquisition message.

11. A method of locating a cellular radiotelephone in a geographic region served by at least two cellular radiotelephone systems comprising, placing a call from said cellular radiotelephone to a command and control center over each cellular system, performing a registration process in each cellular radiotelephone system, communicating the registration information to said command and control center, computing from said registration information the cell or sector location of said cellular radiotelephone in each cellular radiotelephone system, and determining the geographic subarea of a cell or sector of one cellular system in which said cellular radiotelephone is located by the overlapping of said cell or sector by the cell or sector of one or more other cellular systems in which said cellular radiotelephone has been determined to be located.

12. A method of locating a cellular radiotelephone as in claim 11 wherein said cellular radiotelephone has stored in its memory its own electronic serial number and the phone number of a central command and control center, and an activating unit for automatically placing the cellular radiotelephone into operation, said method further comprising, actuating said activating unit and automatically placing calls to said command and control center using the command and control center phone number and identifying itself using said electronic serial number.

13. A method of locating a cellular radiotelephone as in claim 12 further comprising storing in said cellular radiotelephone memory a prearranged message, sending said prearranged message to said command and control center upon being connected to said command and control center, and receiving from said command and control center a confirmation that said prearranged message was received.

14. A method of locating a cellular radiotelephone as in claim 11 including the step of increasing the frequency of performing the registration process upon command from command and control center.

15. A method of precisely locating a modified cellular radiotelephone comprising, activating said modified cellular radiotelephone to a power on state, automatically placing a call to a command and control center over a cellular radiotelephone system and establishing a telephone communication link, sequentially registering with the cellular radiotelephone system whereby the cell or cell sector in which said cellular radiotelephone is located is identified, forwarding the registering information to said command and control center over said communication link, computing and displaying at the command and control center the geographic location of the cell or cell sector in which said modified cellular radiotelephone is located, sending a command to said modified cellular radiotelephone to implement an acquisition mode, said acquisition mode comprising
  a) searching all available forward control channels of the cell and identifying an unused or weakest forward control channel,
  b) locking onto said identified forward control channel, and
  c) transmitting a prearranged message for a short time period on the reverse control channel associated with said locked on forward control channel, directing a mobile acquisition unit with radio direction finding equipment to the cell or cell sector in which said modified cellular radiotelephone has been determined to be located, and using radio direction finding techniques acquiring the signal being transmitted on the reverse control channel.

16. A method as in claim 15 wherein said transmitting of said prearranged message includes transmitting the electronic serial number of said modified cellular radiotelephone and said acquiring of the signal includes detecting the reception of the electronic serial number.

17. A method as in claim 15 wherein the transferring of location from one cell to another is registered and forwarded to said command and control center, and the transferring of location to a cell outside the geographic area of the cellular system in which the modified cellular telephone is currently registered induces a roaming mode and registration in another cellular system.

18. A method as in claim 15 including the step of increasing the frequency of registering.

19. A method as in claim 15 including the step of cycling between transmitting said prearranged message on said reverse control channel associated with the unused or weakest forward control channel and registering with said cellular system on the reverse control channel associated with another forward control channel of the cell in which the modified cellular radiotelephone currently resides.

* * * * *